United States Patent
Hui et al.

(10) Patent No.: US 11,849,310 B2
(45) Date of Patent: *Dec. 19, 2023

(54) SYNCHRONIZED RECEPTION IN MESH NETWORKS

(71) Applicant: Google LLC, Mountain View, CA (US)

(72) Inventors: Jonathan Wing-Yan Hui, Belmont, CA (US); Martin A. Turon, Berkeley, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/045,662

(22) Filed: Oct. 11, 2022

(65) Prior Publication Data

US 2023/0058400 A1 Feb. 23, 2023

Related U.S. Application Data

(63) Continuation of application No. 16/325,663, filed as application No. PCT/US2018/048192 on Aug. 27, 2018, now Pat. No. 11,510,163.

(51) Int. Cl.
*H04W 56/00* (2009.01)
*H04L 43/10* (2022.01)
*H04W 84/18* (2009.01)

(52) U.S. Cl.
CPC ......... *H04W 56/0015* (2013.01); *H04L 43/10* (2013.01); *H04W 84/18* (2013.01)

(58) Field of Classification Search
CPC .... H04W 56/0015; H04W 84/18; H04L 43/10
See application file for complete search history.

(56) References Cited

U.S. PATENT DOCUMENTS

| 8,008,949 | B1 | 8/2011 | Kallam |
| 8,634,341 | B1 * | 1/2014 | Vleugels ............... H04W 56/00 370/324 |

(Continued)

FOREIGN PATENT DOCUMENTS

| EP | 2182762 | 5/2010 |
| GB | 2494660 | 3/2013 |

(Continued)

OTHER PUBLICATIONS

"Final Office Action", U.S. Appl. No. 16/325,663, dated Dec. 27, 2021, 24 pages.

(Continued)

*Primary Examiner* — Saad A. Waqas
(74) *Attorney, Agent, or Firm* — Colby Nipper PLLC

(57) ABSTRACT

This document describes techniques and devices to synchronize communications between devices in a wireless mesh network. Based on the requirements of an end device that sleeps (e.g., is out of communication with the wireless mesh network) for periods of time, the end device indicates to a parent wireless mesh network device that the end device wants to configure operations in a synchronized-reception mode, which causes the parent device to reply with an indication of the clock accuracy of the parent device. The end device uses the clock accuracy of the parent device to determine parameters for synchronized-reception and transmits the parameters to the parent device. The end device activates its receiver based on the parameters to receive data from the parent device.

20 Claims, 8 Drawing Sheets

(56) References Cited

U.S. PATENT DOCUMENTS

| | | | |
|---|---|---|---|
| 11,510,163 | B2 | 11/2022 | Hui et al. |
| 2008/0268855 | A1* | 10/2008 | Hanuni .............. H04L 41/0896 455/445 |
| 2010/0124240 | A1 | 5/2010 | Lu et al. |
| 2012/0092184 | A1* | 4/2012 | Carr .................. H04W 56/0015 340/870.14 |
| 2014/0153560 | A1* | 6/2014 | Zhou ................... H04W 56/002 370/350 |
| 2015/0092640 | A1 | 4/2015 | Mandiganal et al. |
| 2015/0156736 | A1* | 6/2015 | Guo ...................... H04W 84/18 370/350 |
| 2016/0103911 | A1* | 4/2016 | Logue .................. H04L 67/025 707/695 |
| 2016/0227499 | A1 | 8/2016 | Ho |
| 2016/0374043 | A1* | 12/2016 | Wetterwald ....... H04W 56/0045 |
| 2017/0156144 | A1* | 6/2017 | Shudark ................ H04W 24/08 |
| 2018/0145821 | A1 | 5/2018 | Pietilainen |
| 2021/0385771 | A1 | 12/2021 | Hui et al. |

FOREIGN PATENT DOCUMENTS

| | | |
|---|---|---|
| JP | H08274707 | 10/1996 |
| JP | 2008072415 | 3/2008 |
| JP | 2018520566 | 7/2018 |
| WO | 2015107689 | 3/2017 |
| WO | 2020046270 | 3/2020 |

OTHER PUBLICATIONS

"Foreign Office Action", JP Application No. 2020-566619, dated Apr. 20, 2022, 7 pages.

"Foreign Office Action", KR Application No. 10-2022-7011807, dated Jun. 21, 2022, 15 pages.

"Foreign Office Action", KR Application No. 10-2020-7033523, dated Oct. 14, 2021, 18 pages.

"Foreign Office Action", IN Application No. 202047050007, dated Dec. 8, 2021, 6 pages.

"International Preliminary Report on Patentability", Application No. PCT/US2018/048192, dated Mar. 2, 2021, 9 pages.

"International Search Report and Written Opinion", Application No. PCT/US2018/048192, dated May 9, 2019, 15 pages.

"Non-Final Office Action", U.S. Appl. No. 16/325,663, dated Mar. 29, 2022, 19 pages.

"Non-Final Office Action", U.S. Appl. No. 16/325,663, dated Oct. 26, 2021, 16 pages.

"Notice of Allowance", U.S. Appl. No. 16/325,663, 18 pages.

Taylor, "802.15.4 use by external SDOs", Mar. 2013, 17 pages.

"Foreign Office Action", CN Application No. 201880093652.0, dated Dec. 5, 2022, 16 pages.

"Foreign Office Action", EP Application No. 18766476.8, dated Jun. 13, 2023, 7 pages.

* cited by examiner

SYNCHRONIZED RECEPTION IN MESH NETWORKS

RELATED APPLICATIONS

This application is a continuation of and claims priority to U.S. Non-Provisional patent application Ser. No. 16/325,663, filed on Feb. 14, 2019, which in turn is a 35 U.S.C. § 371 National Stage Filing of PCT International Application Serial No. PCT/US2018/048192, filed on Aug. 27, 2018, the disclosures of which are incorporated by reference herein in their entireties.

BACKGROUND

Using wireless mesh networking to connect devices to each other, and to cloud-based services, is increasingly popular for sensing environmental conditions, controlling equipment, and providing information and alerts to users. Many devices on wireless mesh networks are designed to operate for extended periods of time on battery-power, which limits the available computing, user interface, and radio resources in the devices.

Additionally, some wireless mesh network devices may sleep periodically to reduce power consumption and are not in constant radio contact with the mesh network to receive data packets. Sleeping mesh network devices may periodically wake-up and poll a parent mesh network device to determine if data is queued for delivery to the sleeping mesh network device. As the density of wireless mesh network devices in an area increases, increasing polling traffic can cause network congestion and increase communication latency.

For a battery-powered, sleeping mesh network device, relying on polling to check for pending data requires the use of limited battery power to transmit polling requests, even if there is no pending data for the sleeping mesh network device. When an application in the sleeping end device requires low communication latency, battery power is consumed at a greater rate by transmitting polling messages more frequently.

SUMMARY

This summary is provided to introduce simplified concepts of synchronized reception in mesh networks, generally related to synchronizing reception of data from a parent device by an end device in a wireless mesh network. The simplified concepts are further described below in the Detailed Description. This summary is not intended to identify essential features of the claimed subject matter, nor is it intended for use in determining the scope of the claimed subject matter.

In aspects, methods, devices, systems, and means for synchronized reception in mesh networks are described in which an end device transmits a parent request message to a parent device, the parent request message indicating that the end device operates in a receiver-off-when-idle mode. In response to the parent request message, the end device receives a parent response message that includes an indication of a clock accuracy of the parent device. The end device determines, based in part on the received indication of the clock accuracy of the parent device, parameters for synchronized reception of communications from the parent device. The end device transmits a child request message including the parameters for synchronized reception of communications from the parent device, which is effective to cause the parent device to transmit communications to the end device based on the parameters.

The details of one or more implementations are set forth in the accompanying drawings and the following description. Other features and advantages will be apparent from the description and drawings, and from the claims. This summary is provided to introduce subject matter that is further described in the Detailed Description and Drawings. Accordingly, this summary should not be considered to describe essential features nor used to limit the scope of the claimed subject matter.

A method of synchronizing reception of communications by an end device that operates in a receiver-off-when-idle mode in a wireless mesh network is provided. The method comprises transmitting, by the end device, a parent request message to a parent device. The method further comprises, in response to the parent request message, receiving, from the parent device, a parent response message including an indication of a clock accuracy of the parent device. The method further comprises determining, based in part on the received indication of the clock accuracy of the parent device, parameters for synchronized reception of communications from the parent device. The method further comprises transmitting, by the end device, a child request message including the parameters for synchronized reception of communications from the parent device, the transmitting being effective to cause the parent device to transmit communications to the end device based on the parameters.

The method may further comprise, based on the parameters for synchronized reception, periodically activating, by the end device, a receiver for a window of time to receive communications from the parent device.

The activation of the receiver may be based on the received indication of the clock accuracy of the parent device and a time since a previous synchronization.

The method may further comprise, based on receiving a communication from the parent device, determining that additional data for the end device is queued on the parent device and transmitting a polling message to the parent device that is effective to cause the parent device to transmit the additional data.

The method may further comprise based on receiving a communication from the parent device, determining that additional data for the end device is queued on the parent device and keeping the receiver on to receive the additional data.

The method may further comprise, based at least in part on the received indication of the clock accuracy of the parent device, determining that the reception of communications from the parent device is no longer synchronized and based on the determining the reception of communication is no longer synchronized, transmitting a resynchronization message to the parent device that is effective to resynchronize the reception of communications from the parent device.

The method may further comprise based at least in part on the received indication of the clock accuracy of the parent device, determining that the reception of communication from the parent device is no longer synchronized, and periodically transmitting a polling message to parent device to receive data for the end device.

An application in the end device may determine to synchronize communication reception with the parent device based on one or more of: a time of day, a schedule, an occupancy state, a state of a structure in a smart-home system, a state of the end device, an alarm condition, a change in a sensor reading in the end device, a sensor reading exceeding a threshold, an environmental state, receiving an input from a user of the end device, receiving an interaction with the end device, a determination that a higher throughput rate for received communications is required, a determination that a higher network capacity is required, a determination that data for the end device is queued at a server or the parent device, or a determination that a lower communication latency is required.

The parameters for synchronized reception of communications from the parent device may include an indication of a channel for synchronized communications between the parent device and the end device, an indication of a maximum time that the end device will remain synchronized to the parent device, or both.

The child request message may be a Mesh Link Establishment (MLE) Child ID Request message or an MLE Child Update Request message.

A mesh network device configured as an end device is also provided. The mesh network device comprises a mesh network interface configured for communication in a mesh network and a memory and processor system to implement a reception manager application. The reception manager application is configured to transmit, using the mesh network interface, a parent request message to a parent device, the parent request message indicating that the end device operates in a receiver-off-when-idle mode. The reception manager application is further configured to, in response to the parent request message, receive a parent response message including an indication of a clock accuracy of the parent device. The reception manager application is further configured to determine, based in part on the received indication of the clock accuracy of the parent device, parameters for synchronized reception of communications from the parent device. The reception manager application is further configured to transmit a child request message including the parameters for synchronized reception of communications from the parent device, the transmission being effective to cause the parent device to transmit communications to the end device based on the parameters.

The reception manager application is further configured to, based on the parameters for synchronized reception, periodically activate a receiver of the mesh network interface for a window of time to receive communications from the parent device.

The activation of the receiver may be based on the received indication of the clock accuracy of the parent device and a time since a previous synchronization.

The reception manager application is further configured to, based on reception of a communication from the parent device, determine that additional data for the end device is queued on the parent device and transmit a polling message to the parent device that is effective to cause the parent device to transmit the additional data.

The reception manager application is further configured to, based on reception of a communication from the parent device, determine that additional data for the end device is queued on the parent device, and keep the receiver on to receive the additional data.

The reception manager application is further configured to, based at least in part on the received indication of the clock accuracy of the parent device, determine that the reception of communications from the parent device is no longer synchronized, and based on the determination that the reception of communications is no longer synchronized, transmit a resynchronization message to the parent device that is effective to resynchronize the reception of communications from the parent device.

The reception manager application is further configured to, based at least in part on the received indication of the clock accuracy of the parent device, determine that the reception of communication from the parent device is no longer synchronized, and periodically transmit a polling message to parent device to receive data from the parent device.

The parameters for synchronized reception of communications from the parent device include an indication of a channel for synchronized communications between the parent device and the end device, an indication of a maximum time that the end device will remain synchronized to the parent device, or both.

A mesh network system is also provided. The mesh network system comprises a parent device and an end device. The end device is configured to transmit a parent request message to the parent device, the parent request message indicating that the end device operates in a receiver-off-when-idle mode. The end device is further configured to, in response to the parent request message, receive, a parent response message including an indication of a clock accuracy of the parent device. The end device is further configured to, determine, based in part on the received indication of the clock accuracy of the parent device, parameters for synchronized reception of communications from the parent device. The end device is further configured to transmit a child request message including the parameters for synchronized reception of communications from the parent device, the transmission being effective to cause the parent device to transmit communications to the end device based on the parameters.

BRIEF DESCRIPTION OF THE DRAWINGS

Aspects of synchronized reception in mesh networks are described with reference to the following drawings. The same numbers are used throughout the drawings to reference like features and components.

DETAILED DESCRIPTION

Figure 1:
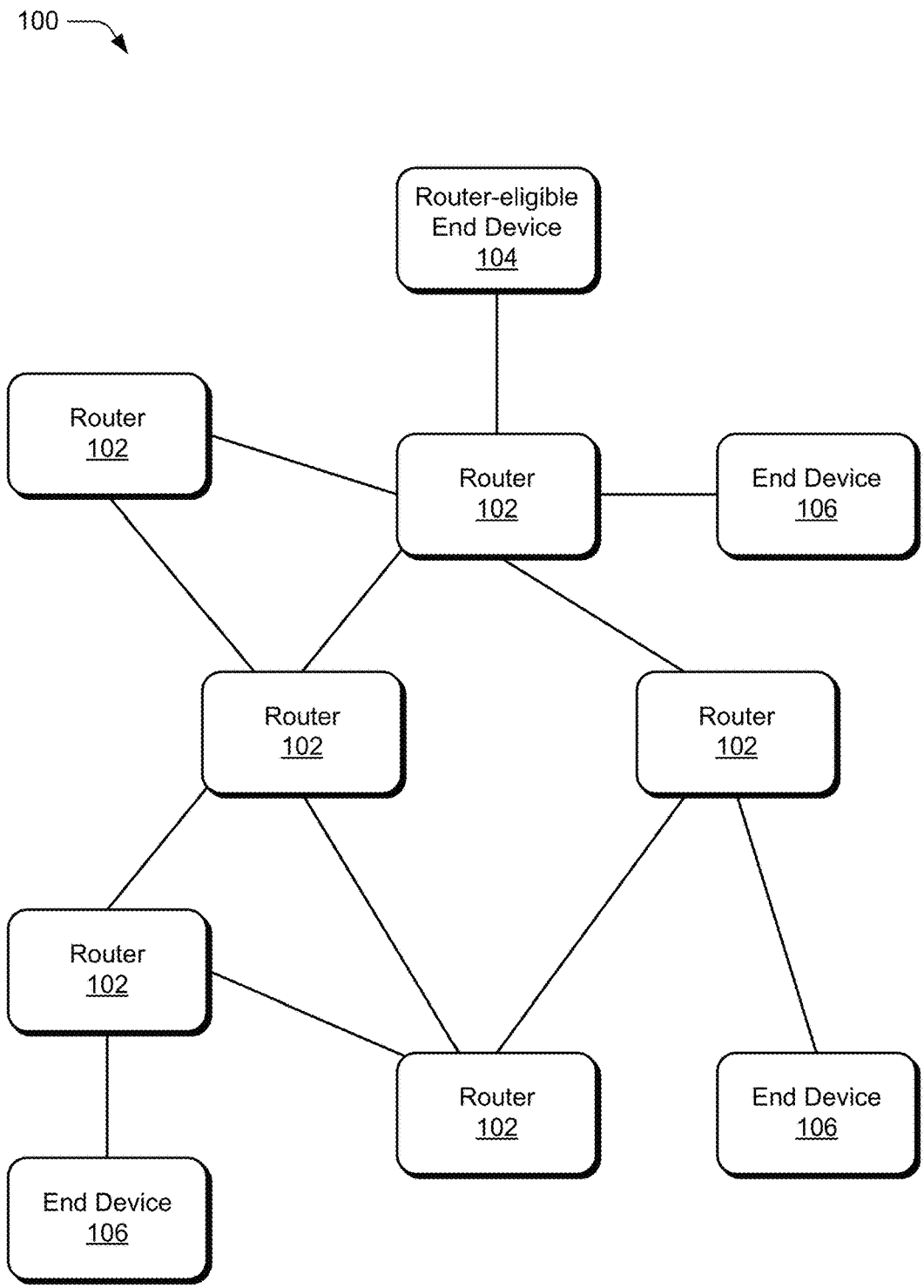
FIG. 1 illustrates an example mesh network system in which various aspects of synchronized reception in mesh networks can be implemented.

This document describes techniques and devices to synchronize communications between devices in a wireless mesh network. Based on the requirements of an end device that sleeps (e.g., is out of communication with the wireless mesh network) for periods of time, the end device indicates to a parent wireless mesh network device that the end device wants to configure operations in a synchronized-reception mode, which causes the parent device to reply with an indication of the clock accuracy of the parent device. The end device uses the clock accuracy of the parent device to determine parameters for synchronized-reception and transmits the parameters to the parent device. The end device activates its receiver based on the parameters to receive data from the parent device.

Wireless mesh networks are communication networks having wireless nodes connected in a mesh topology that provides reliable and redundant communication paths for data traffic within the mesh network. Wireless mesh networks use multiple radio links, or hops, to forward data traffic between devices within the mesh network. This provides coverage for areas larger than the area covered by a single radio link.

Wireless mesh networks can be based on proprietary technologies, or standards-based technologies. For example, wireless mesh networks may be based on the IEEE 802.15.4 standard, which defines physical (PHY) layer and Media Access Control (MAC) layer features and services for use by applications at higher layers of a mesh networking stack. Upper-layer applications rely on these standards-defined services to support addressing and routing of packet data to support application-level communication across a mesh network and between the mesh network and external networks. Similarly, other wireless mesh network technologies, such as Bluetooth®, Thread®, ZigBee®, Z-Wave®, Bluetooth® Low Energy (BLE), Bluetooth Smart, and Bluetooth Mesh have similar layered networking stacks.

Applications at a cloud-based service transmit packets to and receive packets from mesh network devices. These packets traverse a number of networks that use varying technologies. To facilitate low power operation, the mesh network uses low-power radio techniques that may use low data rates to conserve energy. Further, the network connection from a mesh network to the cloud-based service may include cellular wireless systems with bandwidth and cost constraints for transmitting data.

Many devices for mesh networks, such as sensors, are designed for low-power, battery operation over long periods of time, such as months or years. To achieve long service life, a battery-powered mesh device may turn off, or sleep, many of the device functions, such as radio and network interfaces, for periods of time. During sleep periods, the mesh device is not available on the mesh network to receive packets addressed to it. These sleeping mesh devices connect to a parent device that is capable of responding on behalf of the sleeping mesh device when it is not awake and active on the mesh network. The parent device buffers packets destined for the child device and responds, on behalf of the child device.

In aspects, the cloud-based service and various mesh network devices may participate in distributed applications or use cases. The requirements of each use case may require differing levels of communication latency or availability on the mesh network or between the cloud-based service and the mesh network devices. For example, the cloud-based service and/or a mesh network device may determine a mode or state for a smart-home or building automation application related to a structure where the mesh network devices are installed. Example modes or states may include an occupancy state of the structure, an alarm state within the structure, a user interaction related to the structure or a mesh network device within the structure, an environmental condition at the structure, a schedule related to the structure, or the like.

In response to a condition in an end device, such as a sensor reading crossing a threshold, an interaction with the end device, or the like, or during certain states or modes, an end device may determine to operate in a synchronized-reception mode with a parent device to reduce communication latency, reduce power consumption, and/or improve network utilization. The end device may determine to operate in the synchronized-reception mode for a period of time or while a certain state or mode exists and then return to polling for data (e.g., indirect transmission) after the period of time expires.

While features and concepts of the described devices, systems, and methods for synchronized reception in mesh networks can be implemented in any number of different environments, systems, devices, and/or various configurations, aspects of synchronized reception in mesh networks are described in the context of the following example devices, systems, and configurations.

FIG. 1 illustrates an example system as a mesh network 100 in which various aspects of synchronized reception in mesh networks can be implemented. The mesh network 100 is a wireless mesh network that includes routers 102, a router-eligible end device 104, and end devices 106. The routers 102, the router-eligible end device 104, and the end devices 106, each include a mesh network interface for communication over the mesh network. The routers 102 receive and transmit packet data over the respective mesh network interfaces. The routers 102 also route traffic across the mesh network 100.

The router-eligible end device 104 is representative of router-eligible end devices that are located at leaf nodes of the mesh network topology and are not actively routing traffic to other nodes in the mesh network 100. The router-eligible device 104 is capable of becoming a router 102 when the router-eligible device 104 is connected to additional mesh network devices. The end devices 106 are devices that can communicate using the mesh network 100, but lack the capability, beyond simply forwarding packets to its parent router 102, to route traffic in the mesh network 100. For example, a battery-powered sensor is one type of end device 106.

Some end devices 106 may power down (i.e., sleep) some operations or hardware for a portion of the time the end device 106 is operational. For example, the end device 106 may power down radios or network interfaces, to conserve power between operations that require a connection to the mesh network 100. For example, a battery-powered temperature sensor may only be awake periodically to transmit a report of temperature, and then the temperature sensor sleeps until the next time the temperature sensor reports. When the end devices 106 sleep, the end devices 106 are not actively connected to the mesh network 100 to respond to address queries or to receive data packets over the mesh network 100.

Figure 2:
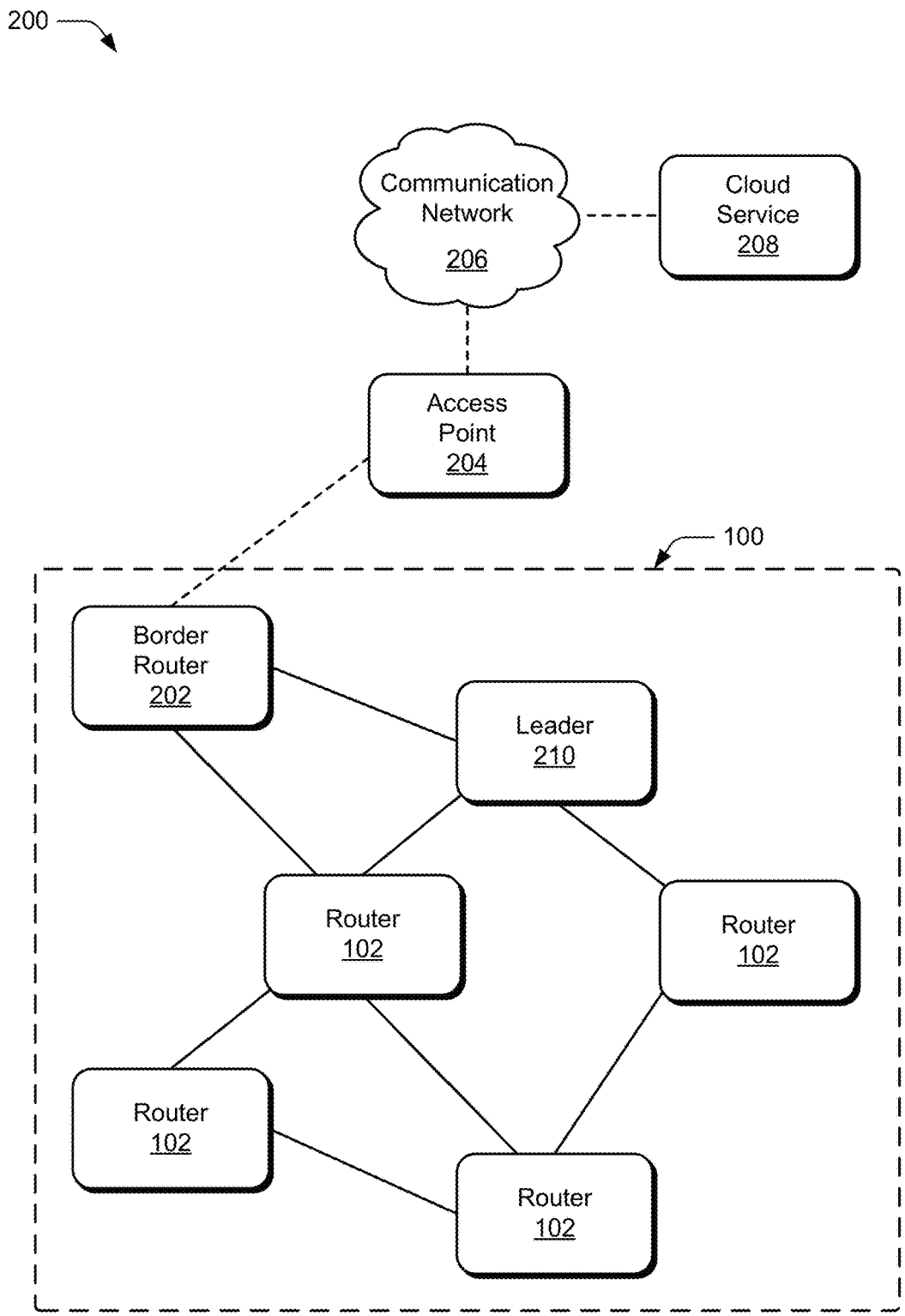
FIG. 2 illustrates an example environment in which various aspects of synchronized reception in mesh networks can be implemented.

FIG. 2 illustrates an example environment 200 in which various aspects and techniques of synchronized reception in mesh networks can be implemented. The environment 200 includes the mesh network 100, in which some routers 102 are performing specific roles in the mesh network 100.

A border router 202 (also known as a gateway and/or an edge router) is one of the routers 102. The border router 202 includes the mesh network interface, as well as a second interface for communication with an external network, outside the mesh network 100. The border router 202 connects to an access point 204 over the external network. For example, the access point 204 may be an Ethernet router, a Wi-Fi access point, a cellular base station, or any other suitable device for bridging different types of networks. Although a single border router 202 is shown in FIG. 2, for the sake of clarity, the mesh network 100 may have any number of border routers 202, which may connect to any number of external networks. In another implementation, an end device 106 may operate as a border router 202. In this case the end device operating as the border router 202 is routing traffic between the mesh network 100 and an external network, but not routing traffic between other mesh network devices.

The access point 204 connects to a communication network 206, such as the Internet. A cloud service 208, which is connected via the communication network 206, provides services related to and/or using the devices within the mesh network 100. By way of example, and not limitation, the cloud service 208 provides applications that include connecting end user devices, such as smart phones, tablets, and the like, to devices in the mesh network 100, processing and presenting data acquired in the mesh network 100 to end users, linking devices in one or more mesh networks 100 to user accounts of the cloud service 208, provisioning and updating devices in the mesh network 100, and so forth. Alternatively or optionally, services described in relation to the cloud service 208 may be distributed completely or partially between the cloud service 208 and a hub device (e.g., the border router 202, a security hub, or the like) that is installed at the structure where the mesh network devices are installed. The storage location of traits, resources, and interfaces of mesh network devices or structure-related information may be dynamically distributed in any suitable fashion between the cloud service 208 and the hub device.

One of the routers 102 performs the role of a leader 210 for the mesh network 100. The leader 210 manages router identifier assignment, is the central arbiter of network configuration information, and propagates network data, which includes the network configuration information, for the mesh network 100.

Synchronized Reception

Figure 3A:
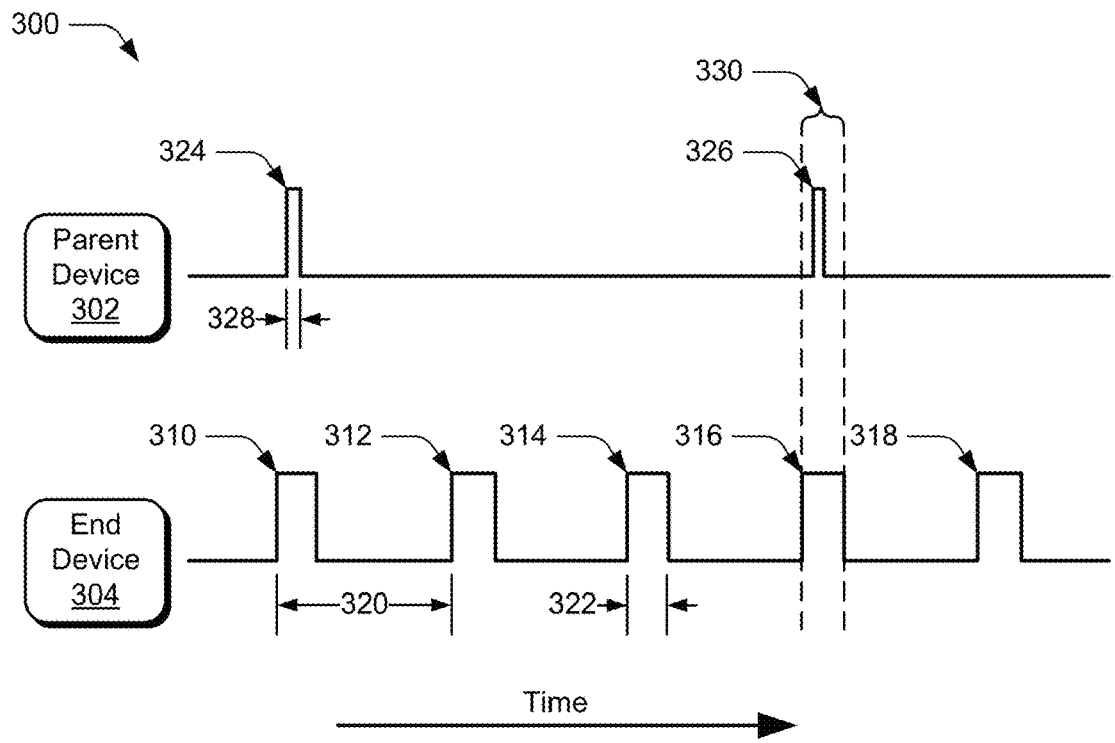
FIG. 3a illustrates an example of transmitter and receiver synchronization in accordance with aspects of the techniques described herein.

As discussed in detail below, an end device decides to, or is configured to, operate in a synchronized-reception mode, which may be established when the end device attaches to a parent device, or at a later point in time. FIG. 3a illustrates an example of transmitter and receiver synchronization 300 between a parent device 302 (e.g., a router 102 or router-eligible end device 104) and an end device 304 (e.g., end device 106). As discussed in detail with respect to FIG. 4 below, the end device 304 establishes a schedule for synchronized reception that is transmitted to the parent device 302, for example using IEEE 802.15.4 Coordinated Sampled Listening (CSL). The end device 304 periodically activates its receiver, shown at 310, 312, 314, 316, and 318, at a time interval 320 and for a receive window 322.

When the parent device 302 has data to transmit to the end device 304, the parent transmits the data as shown at 324 and 326. The end device 304 activates its receiver for the receive window 322, which is selected to be longer than a transmit time 328 of expected or maximum data packet lengths in the wireless mesh network 100. As illustrated at 330, by activating the receiver of the end device 304 for a window that is longer than the transmit expected transmit time 328, the clocks of the parent device 302 and end device 304 may each drift and communications will be successful in spite of the clock drifts.

Figure 3B:
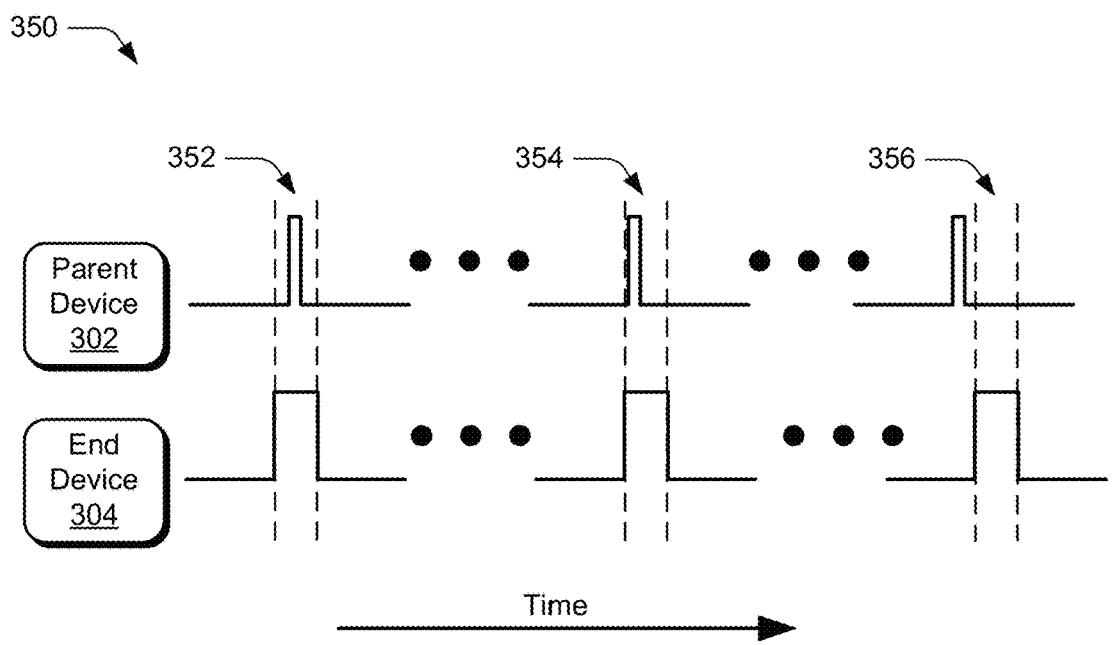
FIG. 3b illustrates another example of transmitter and receiver synchronization in accordance with aspects of the techniques described herein.

FIG. 3b illustrates another example of transmitter and receiver synchronization 350 generally related to clock drift over time for wireless communications between the parent device 302 and the end device 304. Initially after establishing synchronized reception between the parent device 302 and the end device 304, a transmission from the parent device 302 is centered within the receive window 322 as shown at 352. After a period of time, the clocks of the parent device 302 and the end device 304 may drift apart. As shown at 354, the transmission from the parent device 302 is no longer centered in the receive window 322. At 354 the parent device 302 transmission is illustrated as occurring earlier in the receive window 322, such as when the clock of the parent device is faster (drifts higher in frequency) relative to the clock of the end device 304. Alternatively, the parent device 302 transmission may occur later in the receive window 322, when the clock of the parent device is slower (drifts lower in frequency) relative to the clock of the end device 304.

At 356, the clocks of the clocks of the parent device 302 and the end device 304 may drift far enough apart that part or all of the transmission from the parent device 302 falls outside the receive window 322. At this point, the end device 304 can no longer receive transmissions from the parent device in the synchronized reception mode. To continue using synchronized reception, the parent device 302 and end device 304 need to resynchronize or the end device 304 can fall back to indirect transmission by polling the parent device 302 for queued data stored by the parent device 302.

Figure 4:
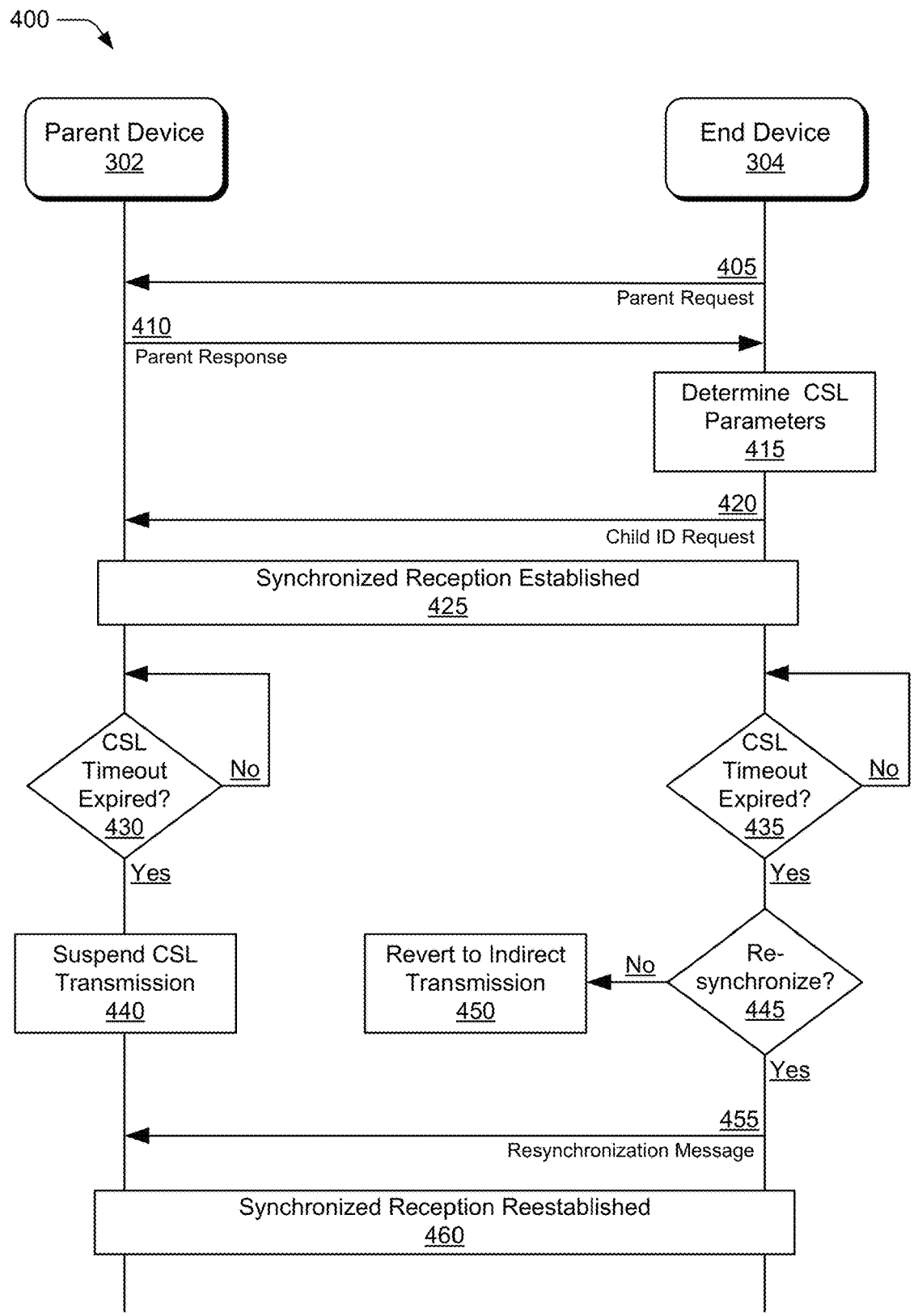
FIG. 4 illustrates example data and control transactions between a parent device and an end device in accordance with aspects of the techniques described herein.

FIG. 4. illustrates example data and control transactions between the parent device 302 and the end device 304 engaged in communication in accordance with various aspects of synchronized reception in mesh networks. At 405 the end device 304 transmits a Mesh Link Establishment (MLE) Parent Request message using multicast addressing to devices in the mesh network 100 including the parent device 302. The MLE Parent Request message includes an indication that the end device 304 is configured to operate in a receiver-off-when-idle (e.g., rx-off-when-idle) mode and/or the synchronized-reception mode. The indication may be a bit in the value of a Mode Type-Length-Value (TLV) that is set to indicate Wake-on-Radio operation, a bit in the value of the Mode Type-Length-Value (TLV) that is set to indicate the end device 304 operates in the rx-off-when-idle mode, or the like.

At 410 the parent device 302 responds to the Parent Request message with an MLE Parent Response message that includes a CSL Accuracy TLV. The CSL Accuracy TLV includes an indication of the clock accuracy of the parent device 302. For example, the CSL Accuracy TLV includes a 16-bit, CslAccuracy value in units of parts-per-million (ppm) of the clock used by the parent device 302 for synchronized reception timings.

At 415 the end device 304, uses the received CslAccuracy value to determine parameters for communication using synchronized reception with the parent device 302. The parameters include a CSL Synchronized Timeout value. For example, the end device 304 uses the CslAccuracy value, and other information such as the clock accuracy of the end device 304, the maximum length of a Media Access (MAC) layer protocol data unit (PDU), or the like to determine the CSL Synchronized Timeout value that indicates when the parent device 302 transmitter and end device 304 receiver will be considered to be no longer synchronized. The CSL Synchronized Timeout value may be a 32-bit unsigned integer value in units of seconds.

At 420 the end device 304 sends an MLE Child ID Request to the parent device 302 that includes parameters for establishing the parent-child relationship with the parent device 302. The MLE Child ID request may include a CSL Channel TLV indicating one or more channels for CSL communications, and/or the CSL Synchronized Timeout TLV, to establish synchronized reception at 425. Alternatively, if including the CSL Channel TLV and/or the CSL Synchronized Timeout TLV causes the MLE Child ID Request to exceed the maximum size of the MAC PDU (MPDU), the end device 304 includes the CSL Channel TLV and/or the CSL Synchronized Timeout TLV in an MLE Child Update Request message, to the parent device 302, to establish synchronized reception.

Additionally or optionally, the end device 304 may still use indirect transmission (polling the parent device 302) while synchronized reception is established. When receiving a data packet from the parent device 302 that includes an indication that additional data packets for the end device 304 are queued on the parent device 302, the end device 304 may use indirect transmission to retrieve the queued data packets. In another aspect, the end device 304 may indicate to the parent device 302 that the end device 304 will leave its receiver on when there is queued data so that the parent device 302 will continue to transmit the queued data after a successful reception of a data packet by the end device 304.

Alternatively, the end device 304 may establish a parent-child relationship without configuring synchronized reception with the parent device 302. At a later time, the end device 304 sends the MLE Child Update Request to the parent device 302 that includes the CSL Channel TLV indicating channels for CSL communications, and/or the CSL Synchronized Timeout TLV, to establish synchronized reception at 425.

The parent device 302 and the end device 304 may communicate using synchronized reception, as described in FIG. 3, after synchronization is established and until the CSL Synchronized Timeout expires indicating that the synchronization error is above a threshold for successful operation of synchronized reception or that the synchronization error is unknown. The parent device 302 and the end device 304 determine if the CSL Timeout has expired, at 430 and 435 respectively. When the parent device 302 determines that the CSL Timeout has expired, the parent device 302 suspends CSL Transmissions at 440.

When the end device 304 determines that the CSL Timeout has expired, the end device 304 determines, at 445, whether to revert to indirect transmission (polling the parent device 302 for queued data packets addressed to the end device 304) to receive data at 450 or to resynchronize with the parent device 302. For example, an application in the end device 304 may determine that synchronized reception should be reestablished, or not, based on an application state, a sensor reading, or the like, as discussed below.

To reestablish synchronized reception, the end device 304 includes CSL Information Elements (IEs) in a resynchronization message to the parent device 302 at 455 which reestablishes synchronized reception at 460. For example, the end device 304 includes the CSL IEs in a mesh-link-reestablishment message or data packet to the parent device 302 to resynchronize synchronized reception. Including the CSL IEs in a message to the parent device 302 resets the CSL Timeout in the parent device 302 and the end device 304. Although FIG. 4 illustrates resynchronization after the CSL Timeout expires, the end device 304 may send the CSL IEs at any time while synchronized reception is established which will resynchronize the parent device 302 and the end device 304 for continued operation using synchronized reception.

Example Applications and Use Cases

In aspects, one or more cloud-based services and various mesh network devices may participate in distributed applications or use cases. The requirements of each use case may require differing levels of communication latency or availability between mesh network devices or between the cloud-based service and the mesh network devices. The applications and use cases below are presented by way of example and not limitation.

A cloud-based service and/or a mesh network device may determine a mode or state related to a smart-home or building automation application for a structure where the mesh network devices are installed. For example, an occupancy state for the structure may indicate that the structure is occupied or that the structure is unoccupied when the occupants are away. When the structure is occupied or transitioning from unoccupied to occupied, it may be desirable for various mesh network devices, such as a thermostat and temperature sensors, to operate using synchronized-reception to provide lower communication latencies and faster response times for closed-loop HVAC control.

Mesh network devices may transition to synchronized reception based on an alarm condition. For example, a mesh network end device may receive an indication of an alarm condition from another mesh network device, may receive an indication of an alarm condition forwarded by another mesh network device, or the mesh network end device itself may determine that an alarm condition exists, such as a sensor reading in the mesh network end device exceeding a threshold value. In response to the alarm condition, the end device may establish (or reestablish) synchronized reception to operate with a lower communication latency to be more responsive while the alarm condition exists. The end device may establish (or reestablish) synchronized reception to suspend polling for data while the alarm condition exists with the effect of reducing potential interference and/or increasing network availability and capacity for other mesh network devices and services communicating in response to the alarm.

Mesh network devices may transition to synchronized reception to increase data reception throughput. For example, a mesh network end device may establish (or reestablish) synchronized reception to increase network throughput for a larger than normal data download, such as receiving a software update. By using synchronized reception, the end device can increase throughput while using less power than would be consumed if the end device used polling to retrieve the software update from a parent device. In a further example, the mesh network end device may periodically check-in with the cloud-based service for queued data packets. The mesh network end device may establish (or reestablish) synchronized reception to increase network throughput to download the queued data packets.

Mesh network devices may transition to synchronized reception based on a schedule. Schedules may be used for states or modes related to a smart-home or building automation applications for the structure where the mesh network devices are installed. A mesh network end device may establish (or reestablish) synchronized reception based on a schedule for a mode or state. For example, an occupancy state for the structure, such as an office building, may be used to indicate periods of occupancy (e.g., normal business hours). During periods of occupancy, end devices may operate using synchronized reception for lower communication latencies to be more responsive to inputs from users occupying the offices.

Mesh network devices may use synchronized reception to increase mesh network capacity. A large number of mesh network devices may be deployed in a commercial building automation system or a homeowner may increase the size of a smart-home network over time. As the scale of the mesh network increases, network traffic may increase interference and collisions that may in turn affect the responsiveness a user experiences when interacting with mesh network devices and applications. For example, based on an assessment of channel conditions, network statistics, a number of devices in the mesh network, a configuration parameter, or the like, an end device may establish (or reestablish) synchronized reception to reduce polling and acknowledgement transmissions on the operating channel of the mesh network to increase overall mesh network capacity and availability.

Mesh network devices may have different communication latency requirements based on an environment state. For example, a solar-powered device, such as a solar-powered sunshade, may establish (or reestablish) synchronized reception to provide low-latency operation during sunny or hot environmental conditions when the sunshade may be able to draw power from solar energy. When the environmental condition changes, such as night time, the sunshade may operate using indirect transmission with a longer communication latency when the need to quickly respond to user interactions in not required.

A mesh network device may transition to synchronized reception based on an interaction with the mesh network device or another mesh network device. For example, a mesh network device may receive an interaction, such as button press by a user, detecting motion or proximity, sensing a contact closure, or the like. In response to the interaction, the mesh network device may establish (or reestablish) synchronized reception to improve response time to commands that may be received in response to the interaction. In another example, another device such as a camera may capture an image or video of an interaction and based on the captured image, video or subsequent facial or image recognition applied to the captured image or video, the mesh network devices may establish (or reestablish) synchronized reception to improve responsiveness to commands resulting from the interaction or subsequent interactions or commands.

Example Method

Example method 500 is described with reference to FIG. 5 in accordance with one or more aspects of synchronized reception in mesh networks. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 5:
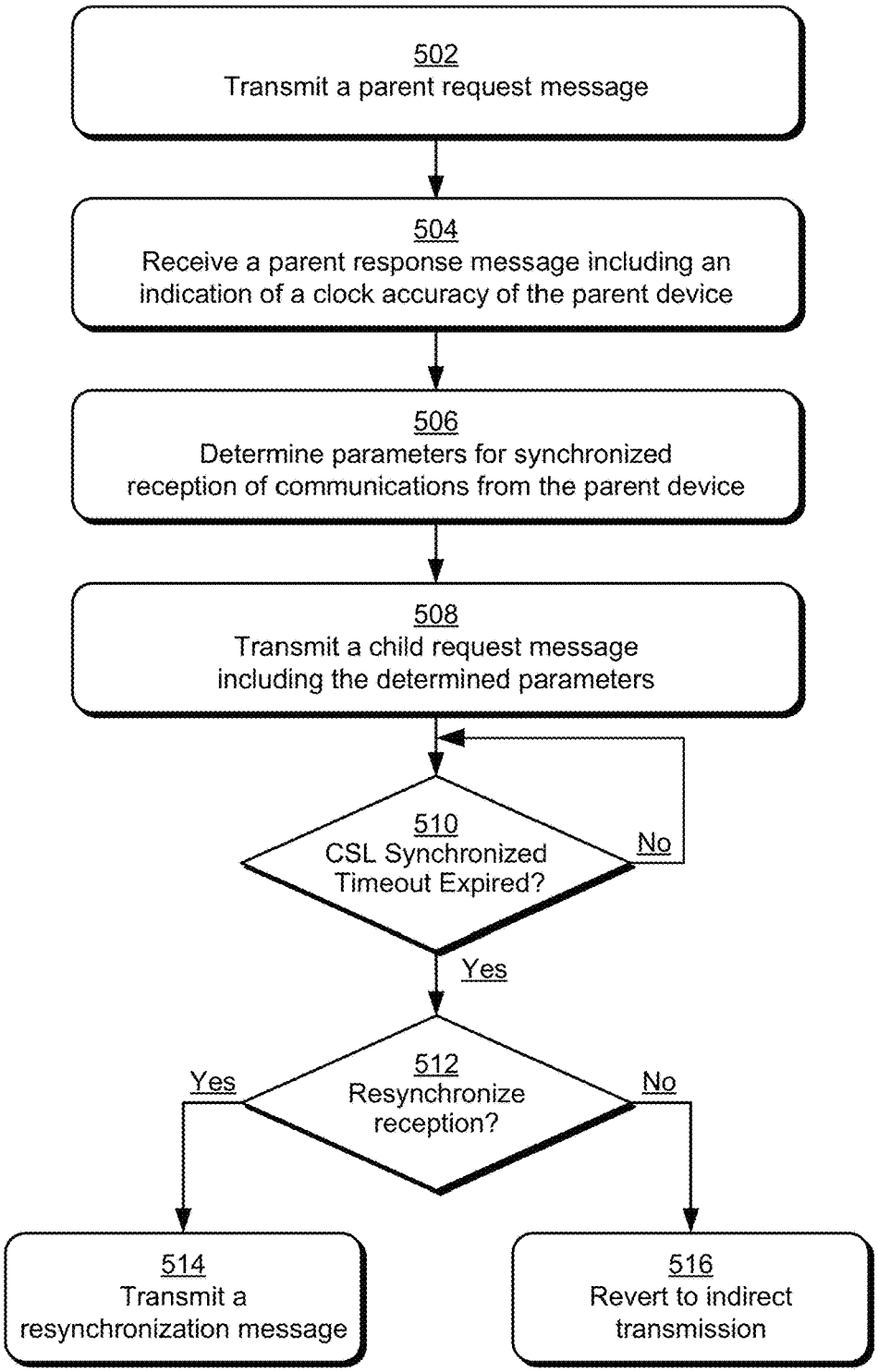
FIG. 5 illustrates an example method of synchronized reception in mesh networks as generally related to establishing synchronized reception between a parent device and an end device in a mesh network in accordance with aspects of the techniques described herein.

FIG. 5 illustrates example method(s) 500 of synchronized reception in mesh networks as generally related to establishing synchronized reception between a parent device and an end device in a mesh network. The order in which the method blocks are described is not intended to be construed as a limitation, and any number of the described method blocks can be combined in any order or skipped to implement a method, or an alternate method.

At block 502, an end device (e.g., end device 304) transmits a parent request message (e.g., an MLE Parent Request message) to a parent device (e.g., the parent device 302).

At block 504, in response to the parent request message, the end device receives, from the parent device, a parent response (e.g., an MLE Parent Response message) including an indication of a clock accuracy (e.g., a CSL accuracy TLV) of the parent device.

At block 506, the end device determines, based in part on the received indication of the clock accuracy of the parent device, parameters for synchronized reception of communications from the parent device.

At block 508, the end device transmits, a child request message (e.g., an MLE Child ID Request message or an MLE Child Update Request message) including the parameters (e.g., the CSL Channel TLV, and/or the CSL Synchronized Timeout TLV) for synchronized reception of communications from the parent device, which causes the parent device to transmit communications to the end device based on the parameters.

At block 510, the end device determines whether a timer indicates that the CSL Synchronized Timeout has expired. If the CSL Synchronized Timeout has expired the end device determines, at block 512, whether to resynchronize the reception of communications with the parent device. If the end device determines to resynchronize the reception of communications with the parent device, the end device transmits a resynchronization message to the parent device at 514, otherwise the end device reverts to indirect transmission to receive queued data packets from the parent device at 516.

Example Environments and Devices

Figure 6:
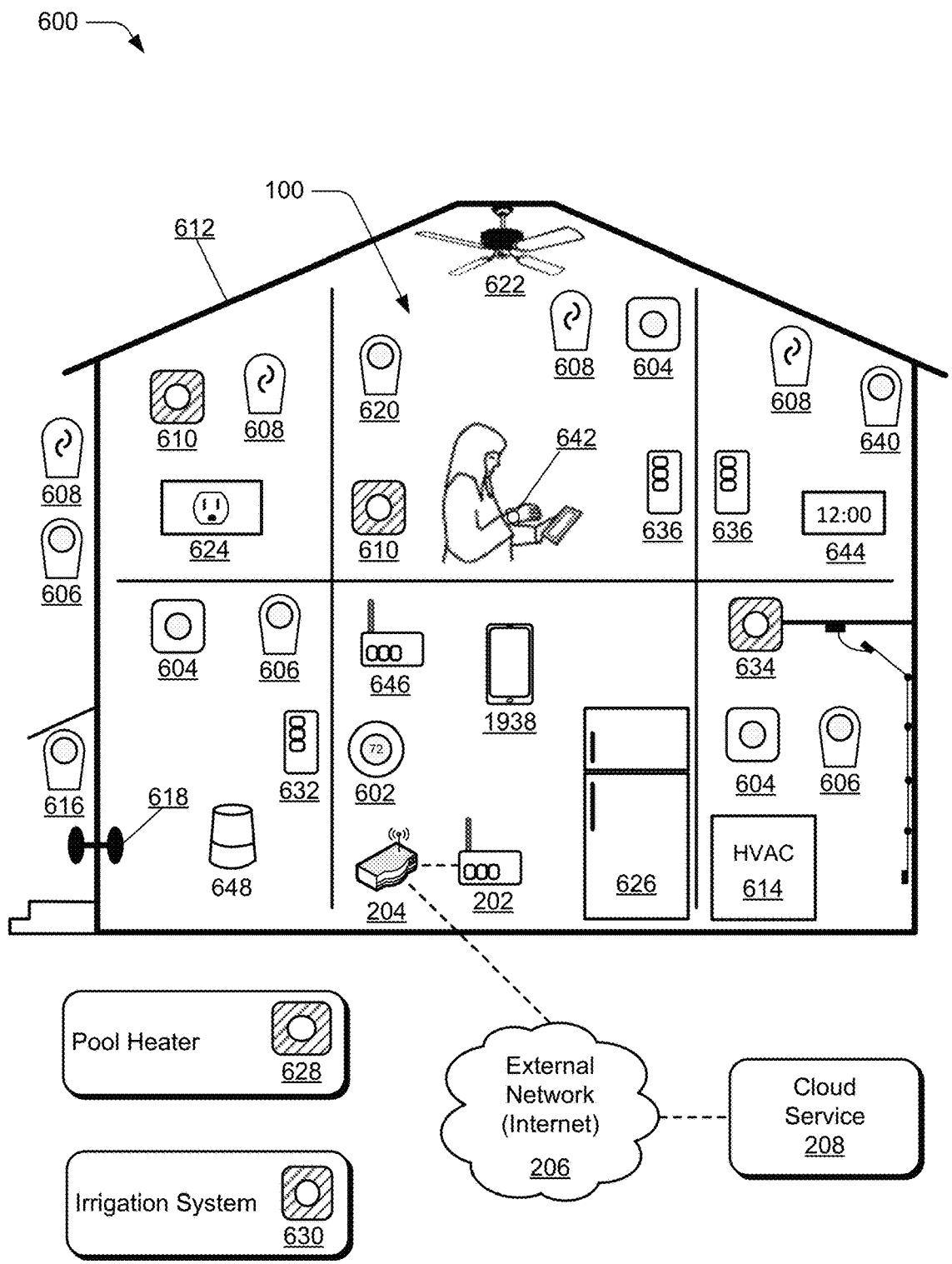
FIG. 6 illustrates an example environment in which a mesh network can be implemented in accordance with aspects of the techniques described herein.

FIG. 6 illustrates an example environment 600 in which the mesh network 100 (as described with reference to FIG. 1), and aspects of synchronized reception in mesh networks can be implemented. Generally, the environment 600 includes the mesh network 100 implemented as part of a smart-home or other type of structure with any number of mesh network devices that are configured for communication in a mesh network. For example, the mesh network devices can include a thermostat 602, hazard detectors 604 (e.g., for smoke and/or carbon monoxide), cameras 606 (e.g., indoor and outdoor), lighting units 608 (e.g., indoor and outdoor), and any other types of mesh network devices 610 that are implemented inside and/or outside of a structure 612 (e.g., in a smart-home environment). In this example, the mesh network devices can also include any of the previously described devices, such as a border router 202, as well as any of the devices implemented as a router device 102, and/or as an end device 106.

In the environment 600, any number of the mesh network devices can be implemented for wireless interconnection to wirelessly communicate and interact with each other. The mesh network devices are modular, intelligent, multi-sensing, network-connected devices that can integrate seamlessly with each other and/or with a central server or a cloud-computing system to provide any of a variety of useful smart-home objectives and implementations. An example of a mesh network device that can be implemented as any of the devices described herein is shown and described with reference to FIG. 7.

In implementations, the thermostat 602 may include a Nest® Learning Thermostat that detects ambient climate characteristics (e.g., temperature and/or humidity) and controls a HVAC system 614 in the smart-home environment. The learning thermostat 602 and other smart devices "learn" by capturing occupant settings to the devices. For example, the thermostat learns preferred temperature set-points for mornings and evenings, and when the occupants of the structure are asleep or awake, as well as when the occupants are typically away or at home.

A hazard detector 604 can be implemented to detect the presence of a hazardous substance or a substance indicative of a hazardous substance (e.g., smoke, fire, or carbon monoxide). In examples of wireless interconnection, a hazard detector 604 may detect the presence of smoke, indicating a fire in the structure, in which case the hazard detector that first detects the smoke can broadcast a low-power wake-up signal to all of the connected mesh network devices. The other hazard detectors 604 can then receive the broadcast wake-up signal and initiate a high-power state for hazard detection and to receive wireless communications of alert messages. Further, the lighting units 608 can receive the broadcast wake-up signal and activate in the region of the detected hazard to illuminate and identify the problem area. In another example, the lighting units 608 may activate in one illumination color to indicate a problem area or region in the structure, such as for a detected fire or break-in, and activate in a different illumination color to indicate safe regions and/or escape routes out of the structure.

In various configurations, the mesh network devices 610 can include an entryway interface device 616 that functions in coordination with a network-connected door lock system 618, and that detects and responds to a person's approach to or departure from a location, such as an outer door of the structure 612. The entryway interface device 616 can interact with the other mesh network devices based on whether someone has approached or entered the smart-home environment. An entryway interface device 616 can control doorbell functionality, announce the approach or departure of a person via audio or visual means, and control settings on a security system, such as to activate or deactivate the security system when occupants come and go. The mesh network devices 610 can also include other sensors and detectors, such as to detect ambient lighting conditions, detect room-occupancy states (e.g., with an occupancy sensor 620), and control a power and/or dim state of one or more lights. In some instances, the sensors and/or detectors may also control a power state or speed of a fan, such as a ceiling fan 622. Further, the sensors and/or detectors may detect occupancy in a room or enclosure and control the supply of power to electrical outlets or devices 624, such as if a room or the structure is unoccupied.

The mesh network devices 610 may also include connected appliances and/or controlled systems 626, such as refrigerators, stoves and ovens, washers, dryers, air conditioners, pool heaters 628, irrigation systems 630, security systems 632, and so forth, as well as other electronic and computing devices, such as televisions, entertainment systems, computers, intercom systems, garage-door openers 634, ceiling fans 622, control panels 636, and the like. When plugged in, an appliance, device, or system can announce itself to the mesh network as described above and can be automatically integrated with the controls and devices of the mesh network, such as in the smart-home. It should be noted that the mesh network devices 610 may include devices physically located outside of the structure, but within wireless communication range, such as a device controlling a swimming pool heater 628 or an irrigation system 630.

As described above, the mesh network 100 includes a border router 202 that interfaces for communication with an external network, outside the mesh network 100. The border router 202 connects to an access point 204, which connects to the communication network 206, such as the Internet. A cloud service 208, which is connected via the communication network 206, provides services related to and/or using the devices within the mesh network 100. By way of example, the cloud service 208 can include applications for connecting end user devices 638, such as smart phones, tablets, and the like, to devices in the mesh network, processing and presenting data acquired in the mesh network 100 to end users, linking devices in one or more mesh networks 100 to user accounts of the cloud service 208, provisioning and updating devices in the mesh network 100, and so forth. For example, a user can control the thermostat 602 and other mesh network devices in the smart-home environment using a network-connected computer or portable device, such as a mobile phone or tablet device. Further, the mesh network devices can communicate information to any central server or cloud-computing system via the border router 202 and the access point 204. The data communications can be carried out using any of a variety of custom or standard wireless protocols (e.g., Wi-Fi, ZigBee for low power, 6LoWPAN, Thread, etc.) and/or by using any of a variety of custom or standard wired protocols (CAT6 Ethernet, HomePlug, etc.).

Any of the mesh network devices in the mesh network 100 can serve as low-power and communication nodes to create the mesh network 100 in the smart-home environment. Individual low-power nodes of the network can regularly send out messages regarding what they are sensing, and the other low-powered nodes in the environment—in addition to sending out their own messages—can repeat the messages, thereby communicating the messages from node to node (i.e., from device to device) throughout the mesh network. The mesh network devices can be implemented to conserve power, particularly when battery-powered, utilizing low-powered communication protocols to receive the messages, translate the messages to other communication protocols, and send the translated messages to other nodes and/or to a central server or cloud-computing system. For example, an occupancy and/or ambient light sensor can detect an occupant in a room as well as measure the ambient light, and activate the light source when the ambient light sensor 640 detects that the room is dark and when the occupancy sensor 620 detects that someone is in the room. Further, the sensor can include a low-power wireless communication chip (e.g., a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly, using the mesh network, from node to node (i.e., smart device to smart device) within the smart-home environment as well as over the Internet to a central server or cloud-computing system.

In other configurations, various ones of the mesh network devices can function as "tripwires" for an alarm system in the smart-home environment. For example, in the event a perpetrator circumvents detection by alarm sensors located at windows, doors, and other entry points of the structure or environment, the alarm could still be triggered by receiving an occupancy, motion, heat, sound, etc. message from one or more of the low-powered mesh nodes in the mesh network. In other implementations, the mesh network can be used to automatically turn on and off the lighting units 608 as a person transitions from room to room in the structure. For example, the mesh network devices can detect the person's movement through the structure and communicate corresponding messages via the nodes of the mesh network. Using the messages that indicate which rooms are occupied, other mesh network devices that receive the messages can activate and/or deactivate accordingly. As referred to above, the mesh network can also be utilized to provide exit lighting in the event of an emergency, such as by turning on the appropriate lighting units 608 that lead to a safe exit. The light units 608 may also be turned-on to indicate the direction along an exit route that a person should travel to safely exit the structure.

The various mesh network devices may also be implemented to integrate and communicate with wearable computing devices 642, such as may be used to identify and locate an occupant of the structure, and adjust the temperature, lighting, sound system, and the like accordingly. In other implementations, RFID sensing (e.g., a person having an RFID bracelet, necklace, or key fob), synthetic vision techniques (e.g., video cameras and face recognition processors), audio techniques (e.g., voice, sound pattern, vibration pattern recognition), ultrasound sensing/imaging techniques, and infrared or near-field communication (NFC) techniques (e.g., a person wearing an infrared or NFC-capable smartphone), along with rules-based inference engines or artificial intelligence techniques that draw useful conclusions from the sensed information as to the location of an occupant in the structure or environment.

In other implementations, personal comfort-area networks, personal health-area networks, personal safety-area networks, and/or other such human-facing functionalities of service robots can be enhanced by logical integration with other mesh network devices and sensors in the environment according to rules-based inferencing techniques or artificial intelligence techniques for achieving better performance of these functionalities. In an example relating to a personal health-area, the system can detect whether a household pet is moving toward the current location of an occupant (e.g., using any of the mesh network devices and sensors), along with rules-based inferencing and artificial intelligence techniques. Similarly, a hazard detector service robot can be notified that the temperature and humidity levels are rising in a kitchen, and temporarily raise a hazard detection threshold, such as a smoke detection threshold, under an inference that any small increases in ambient smoke levels will most likely be due to cooking activity and not due to a genuinely hazardous condition. Any service robot that is configured for any type of monitoring, detecting, and/or servicing can be implemented as a mesh node device on the mesh network, conforming to the wireless interconnection protocols for communicating on the mesh network.

The mesh network devices 610 may also include a smart alarm clock 644 for each of the individual occupants of the structure in the smart-home environment. For example, an occupant can customize and set an alarm device for a wake time, such as for the next day or week. Artificial intelligence can be used to consider occupant responses to the alarms when they go off and make inferences about preferred sleep patterns over time. An individual occupant can then be tracked in the mesh network based on a unique signature of the person, which is determined based on data obtained from sensors located in the mesh network devices, such as sensors that include ultrasonic sensors, passive IR sensors, and the like. The unique signature of an occupant can be based on a combination of patterns of movement, voice, height, size, etc., as well as using facial recognition techniques.

In an example of wireless interconnection, the wake time for an individual can be associated with the thermostat 602 to control the HVAC system in an efficient manner so as to pre-heat or cool the structure to desired sleeping and awake temperature settings. The preferred settings can be learned over time, such as by capturing the temperatures set in the thermostat before the person goes to sleep and upon waking up. Collected data may also include biometric indications of a person, such as breathing patterns, heart rate, movement, etc., from which inferences are made based on this data in combination with data that indicates when the person actually wakes up. Other mesh network devices can use the data to provide other smart-home objectives, such as adjusting the thermostat 602 so as to pre-heat or cool the environment to a desired setting, and turning-on or turning-off the lights 608.

In implementations, the mesh network devices can also be utilized for sound, vibration, and/or motion sensing such as to detect running water and determine inferences about water usage in a smart-home environment based on algorithms and mapping of the water usage and consumption. This can be used to determine a signature or fingerprint of each water source in the home, and is also referred to as "audio fingerprinting water usage." Similarly, the mesh network devices can be utilized to detect the subtle sound, vibration, and/or motion of unwanted pests, such as mice and other rodents, as well as by termites, cockroaches, and other insects. The system can then notify an occupant of the suspected pests in the environment, such as with warning messages to help facilitate early detection and prevention.

The environment 600 may include one or more mesh network devices 102 that function as a hub 646. The hub 646 may be a general-purpose home automation hub, or an application-specific hub, such as a security hub, an energy management hub, an HVAC hub, and so forth. The functionality of a hub 646 may also be integrated into any mesh network device 102, such as a smart thermostat device or the border router 202. Hosting functionality on the hub 646 in the structure 612 can improve reliability when the user's internet connection is unreliable, can reduce latency of operations that would normally have to connect to the cloud service 208, and can satisfy system and regulatory constraints around local access between mesh network devices 102.

Additionally, the example environment 600 includes a smart-speaker 648. The smart-speaker 648 provides voice assistant services that include providing voice control of smart-home devices. The functions of the hub 646 may be hosted in the smart-speaker 648. The smart-speaker 648 can be configured to communicate via the mesh network, Wi-Fi, or both.

Figure 7:
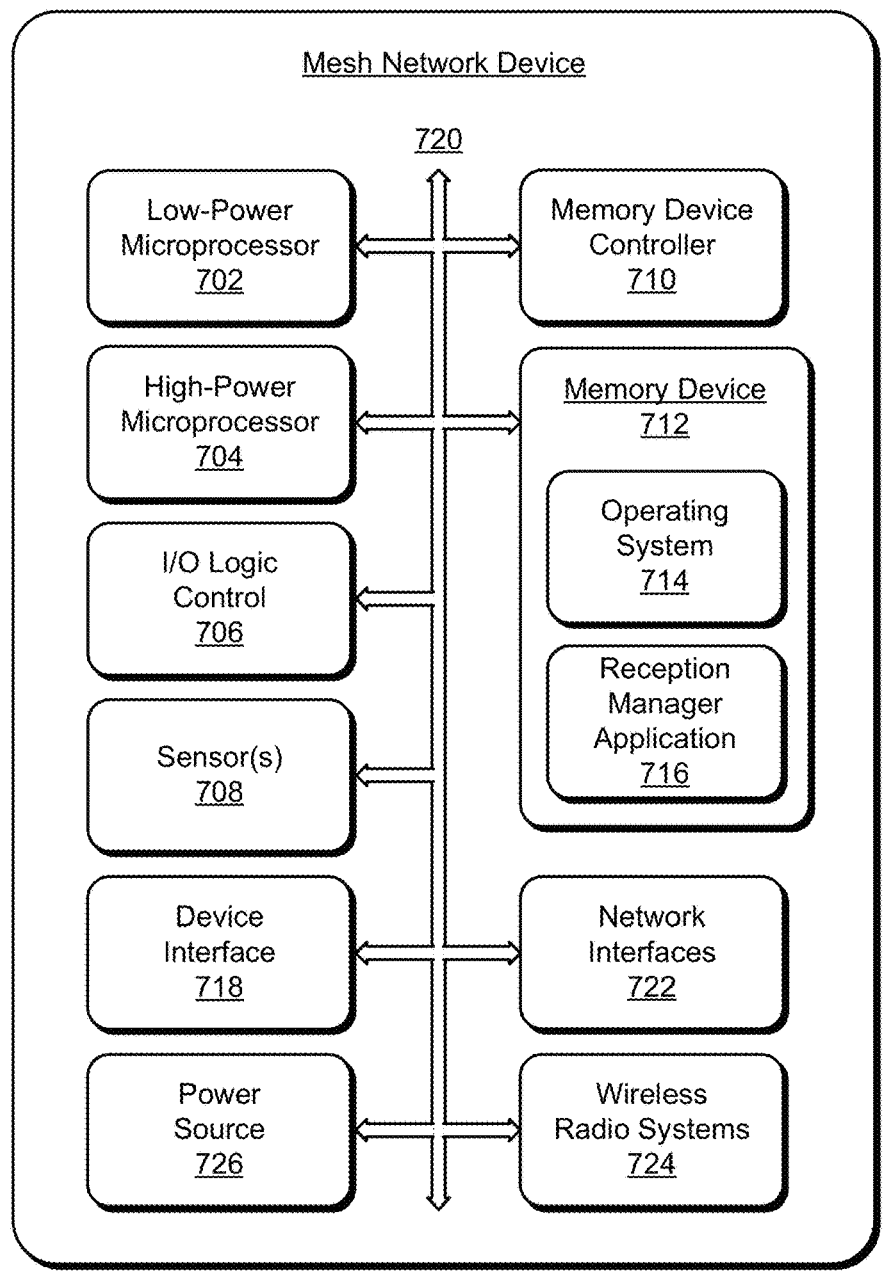
FIG. 7 illustrates an example mesh network device that can be implemented in a mesh network environment in accordance with one or more aspects of the techniques described herein.

FIG. 7 illustrates an example mesh network device 700 that can be implemented as any of the mesh network devices in a mesh network in accordance with one or more aspects of synchronized reception in mesh networks as described herein. The device 700 can be integrated with electronic circuitry, microprocessors, memory, input output (I/O) logic control, communication interfaces and components, as well as other hardware, firmware, and/or software to implement the device in a mesh network. Further, the mesh network device 700 can be implemented with various components, such as with any number and combination of different components as further described with reference to the example device shown in FIG. 8.

In this example, the mesh network device 700 includes a low-power microprocessor 702 and a high-power microprocessor 704 (e.g., microcontrollers or digital signal processors) that process executable instructions. The device also includes an input-output (I/O) logic control 706 (e.g., to include electronic circuitry). The microprocessors can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The low-power microprocessor 702 and the high-power microprocessor 704 can also support one or more different device functionalities of the device. For example, the high-power microprocessor 704 may execute computationally intensive operations, whereas the low-power microprocessor 702 may manage less complex processes such as detecting a hazard or temperature from one or more sensors 708. The low-power processor 702 may also wake or initialize the high-power processor 704 for computationally intensive processes.

The one or more sensors 708 can be implemented to detect various properties such as acceleration, temperature, humidity, water, supplied power, proximity, external motion, device motion, sound signals, ultrasound signals, light signals, fire, smoke, carbon monoxide, global-positioning-satellite (GPS) signals, radio-frequency (RF), other electromagnetic signals or fields, or the like. As such, the sensors 708 may include any one or a combination of temperature sensors, humidity sensors, hazard-related sensors, other environmental sensors, accelerometers, microphones, optical sensors up to and including cameras (e.g., charged coupled-device or video cameras, active or passive radiation sensors, GPS receivers, and radio frequency identification detectors. In implementations, the mesh network device 700 may include one or more primary sensors, as well as one or more secondary sensors, such as primary sensors that sense data central to the core operation of the device (e.g., sensing a temperature in a thermostat or sensing smoke in a smoke detector), while the secondary sensors may sense other types of data (e.g., motion, light or sound), which can be used for energy-efficiency objectives or smart-operation objectives.

The mesh network device 700 includes a memory device controller 710 and a memory device 712, such as any type of a nonvolatile memory and/or other suitable electronic data storage device. The mesh network device 700 can also include various firmware and/or software, such as an operating system 714 that is maintained as computer executable instructions by the memory and executed by a microprocessor. The device software may also include a reception manager application 716 that implements aspects of synchronized reception in mesh networks. The mesh network device 700 also includes a device interface 718 to interface with another device or peripheral component, and includes an integrated data bus 720 that couples the various components of the mesh network device for data communication between the components. The data bus in the mesh network device may also be implemented as any one or a combination of different bus structures and/or bus architectures.

The device interface 718 may receive input from a user and/or provide information to the user (e.g., as a user interface), and a received input can be used to determine a setting. The device interface 718 may also include mechanical or virtual components that respond to a user input. For example, the user can mechanically move a sliding or rotatable component, or the motion along a touchpad may be detected, and such motions may correspond to a setting adjustment of the device. Physical and virtual movable user-interface components can allow the user to set a setting along a portion of an apparent continuum. The device interface 718 may also receive inputs from any number of peripherals, such as buttons, a keypad, a switch, a microphone, and an imager (e.g., a camera device).

The mesh network device 700 can include network interfaces 722, such as a mesh network interface for communication with other mesh network devices in a mesh network, and an external network interface for network communication, such as via the Internet. The mesh network device 700 also includes wireless radio systems 724 for wireless communication with other mesh network devices via the mesh network interface and for multiple, different wireless communications systems. The wireless radio systems 724 may include Wi-Fi, Bluetooth™, Mobile Broadband, BLE, and/or point-to-point IEEE 802.15.4. Each of the different radio systems can include a radio device, antenna, and chipset that is implemented for a particular wireless communications technology. The mesh network device 700 also includes a power source 726, such as a battery and/or to connect the device to line voltage. An AC power source may also be used to charge the battery of the device.

Figure 8:
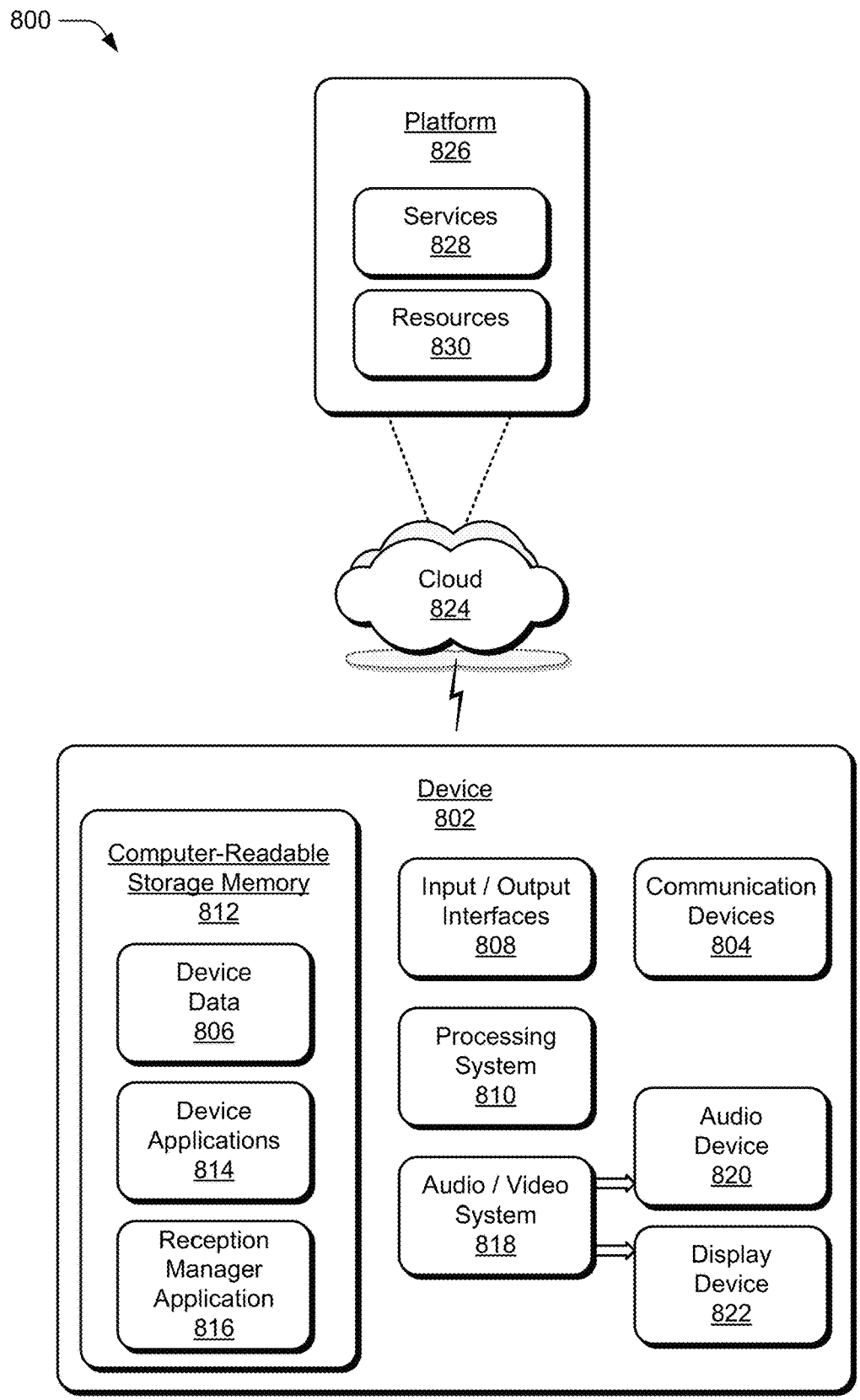
FIG. 8 illustrates an example system with an example device that can implement aspects of synchronized reception in mesh networks.

FIG. 8 illustrates an example system 800 that includes an example device 802, which can be implemented as any of the mesh network devices that implement aspects of synchronized reception in mesh networks as described with reference to the previous FIGS. 1-7. The example device 802 may be any type of computing device, client device, mobile phone, tablet, communication, entertainment, gaming, media playback, and/or other type of device. Further, the example device 802 may be implemented as any other type of mesh network device that is configured for communication on a mesh network, such as a thermostat, hazard detector, camera, light unit, commissioning device, router, border router, joiner router, joining device, end device, leader, access point, and/or other mesh network devices.

The device 802 includes communication devices 804 that enable wired and/or wireless communication of device data 806, such as data that is communicated between the devices in a mesh network, data that is being received, data scheduled for broadcast, data packets of the data, data that is synched between the devices, etc. The device data can include any type of communication data, as well as audio, video, and/or image data that is generated by applications executing on the device. The communication devices 804 can also include transceivers for cellular phone communication and/or for network data communication.

The device 802 also includes input/output (I/O) interfaces 808, such as data network interfaces that provide connection and/or communication links between the device, data networks (e.g., a mesh network, external network, etc.), and other devices. The I/O interfaces can be used to couple the device to any type of components, peripherals, and/or accessory devices. The I/O interfaces also include data input ports via which any type of data, media content, and/or inputs can be received, such as user inputs to the device, as well as any type of communication data, as well as audio, video, and/or image data received from any content and/or data source.

The device 802 includes a processing system 810 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 802 may further include any type of a system bus or other data and command transfer system that couples the various components within the device. A system bus can include any one or combination of different bus structures and architectures, as well as control and data lines.

The device 802 also includes computer-readable storage memory 812, such as data storage devices that can be accessed by a computing device, and that provide persistent storage of data and executable instructions (e.g., software applications, modules, programs, functions, and the like). The computer-readable storage memory described herein excludes propagating signals. Examples of computer-readable storage memory include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage memory in various memory device configurations.

The computer-readable storage memory 812 provides storage of the device data 806 and various device applications 814, such as an operating system that is maintained as a software application with the computer-readable storage memory and executed by the processing system 810. The device applications may also include a device manager, such as any form of a control application, software application, signal processing and control module, code that is native to a particular device, a hardware abstraction layer for a particular device, and so on. In this example, the device applications also include a reception manager application 816 that implements aspects of synchronized reception in mesh networks, such as when the example device 802 is implemented as any of the mesh network devices described herein.

The device 802 also includes an audio and/or video system 818 that generates audio data for an audio device 820 and/or generates display data for a display device 822. The audio device and/or the display device include any devices that process, display, and/or otherwise render audio, video, display, and/or image data, such as the image content of a digital photo. In implementations, the audio device and/or the display device are integrated components of the example device 802. Alternatively, the audio device and/or the display device are external, peripheral components to the example device. In aspects, at least part of the techniques described for synchronized reception in mesh networks may be implemented in a distributed system, such as over a "cloud" 824 in a platform 826. The cloud 824 includes and/or is representative of the platform 826 for services 828 and/or resources 830.

The platform 826 abstracts underlying functionality of hardware, such as server devices (e.g., included in the services 828) and/or software resources (e.g., included as the resources 830), and connects the example device 802 with other devices, servers, etc. The resources 830 may also include applications and/or data that can be utilized while computer processing is executed on servers that are remote from the example device 802. Additionally, the services 828 and/or the resources 830 may facilitate subscriber network services, such as over the Internet, a cellular network, or Wi-Fi network. The platform 826 may also serve to abstract and scale resources to service a demand for the resources 830 that are implemented via the platform, such as in an interconnected device aspect with functionality distributed throughout the system 800. For example, the functionality may be implemented in part at the example device 802 as well as via the platform 826 that abstracts the functionality of the cloud 824.

Although aspects of synchronized reception in mesh networks have been described in language specific to features and/or methods, the subject of the appended claims is not necessarily limited to the specific features or methods described. Rather, the specific features and methods are disclosed as example implementations of synchronized reception in mesh networks, and other equivalent features and methods are intended to be within the scope of the appended claims. Further, various different aspects are described and it is to be appreciated that each described aspect can be implemented independently or in connection with one or more other described aspects.

What is claimed is:

1. A method of synchronizing reception of communications by a parent device with an end device that operates in a receiver-off-when-idle mode in a wireless mesh network, the method comprising:
   receiving, by the parent device, a parent request message from the end device;
   in response to the receiving the parent request message, transmitting a parent response message including an indication of a clock accuracy of the parent device that is effective to cause the end device to determine parameters for synchronized reception of communications from the parent device;
   receiving, by the parent device, a child request message including the parameters for synchronized reception of communications from the parent device, the parameters for synchronized reception including the synchronized timeout value calculated by the end device;
   in response to the receiving the child request message, transmitting communications to the end device based on the parameters; and
   based on the parameters for synchronized reception of communications, determining to suspend the transmitting the communications to the end device based on an expiration of a timer for a synchronized timeout value.

2. The method of claim 1, further comprising:
   receiving, from the end device, a resynchronization message that is effective to resynchronize the reception of communications from the parent device; and in response to the receiving the resynchronization message, transmitting synchronized communications to the end device.

3. The method of claim 2, further comprising:
in response to the receiving the resynchronization message, resetting a timer for the synchronized timeout value.

4. The method of claim 1, further comprising:
periodically receiving, from the end device, a polling message that causes the parent device to transmit data to the end device.

5. The method of claim 1, wherein the transmitting communications to the end device occurs during a window of time when the end device activates a receiver to receive the communications.

6. The method of claim 1, further comprising:
including an indication in a data packet that additional data packets for the end device are queued at the parent device; and
transmitting the data packet to the end device, the transmitting being effective to cause the end device to keep a receiver active to receive the additional data packets.

7. The method of claim 6, further comprising:
transmitting the additional data packets to the end device.

8. The method of claim 1, wherein the parameters for synchronized reception of communications from the parent device include an indication of a channel for synchronized communications between the parent device and the end device, an indication of a maximum time that the end device will remain synchronized to the parent device, or both.

9. The method of claim 1, wherein the parent request message is a Mesh Link Establishment (MLE) Parent Request message.

10. A mesh network device configured as a parent device, the mesh network device comprising:
a mesh network interface configured for communication in a mesh network; and
a memory and processor system to implement a reception manager application that is configured to:
receive a parent request message from an end device;
in response to the reception of the parent request message, transmit a parent response message including an indication of a clock accuracy of the parent device that is effective to cause the end device to determine parameters for synchronized reception of communications from the parent device;
receive a child request message including the parameters for synchronized reception of communications from the parent device, the parameters for synchronized reception including a synchronized timeout value calculated by the end device;
in response to the reception of the child request message, transmit communications to the end device based on the parameters; and
based on the parameters for synchronized reception of communications, determine to suspend the transmission of the communications to the end device based on an expiration of a timer for the synchronized timeout value.

11. The mesh network device of claim 10, wherein the reception manager application is further configured to:
receive, from the end device, a resynchronization message that is effective to resynchronize the reception of communications from the parent device; and
in response to reception of the resynchronization message, transmit synchronized communications to the end device.

12. The mesh network device of claim 11, wherein the reception manager application is further configured to:
in response to the reception of the resynchronization message, reset a timer for the synchronized timeout value.

13. The mesh network device of claim 10, wherein the reception manager application is further configured to:
periodically receive, from the end device, a polling message that causes the parent device to transmit data to the end device.

14. The mesh network device of claim 10, wherein the transmission of communications to the end device occurs during a window of time when the end device activates a receiver to receive the communications.

15. The mesh network device of claim 10, wherein the reception manager application is further configured to:
include an indication in a data packet that additional data packets for the end device are queued at the parent device; and
transmit the data packet to the end device, the transmission being effective to cause the end device to keep a receiver active to receive the additional data packets.

16. The mesh network device of claim 15, herein the reception manager application is further configured to:
transmit the additional data packets to the end device.

17. The mesh network device of claim 10, wherein the parameters for synchronized reception of communications from the parent device include an indication of a channel for synchronized communications between the parent device and the end device, an indication of a maximum time that the end device will remain synchronized to the parent device, or both.

18. The mesh network device of claim 10, wherein the parent request message is a Mesh Link Establishment (MLE) Parent Request message.

19. A non-transitory computer readable storage memory storing a program configured for execution by a mesh network device for synchronizing reception of communications with an end device that operates in a receiver-off-when-idle mode in a wireless mesh network logic, the program comprising instructions executable to:
receive a parent request message from an end device;
in response to the reception of the parent request message, transmit a parent response message including an indication of a clock accuracy of a parent device that is effective to cause the end device to determine parameters for synchronized reception of communications from the parent device;
receive a child request message including the parameters for synchronized reception of communications from the parent device, the parameters for synchronized reception including a synchronized timeout value calculated by the end device;
in response to the reception of the child request message, transmit communications to the end device based on the parameters; and
based on the parameters for synchronized reception of communications, determine to suspend the transmission of the communications to the end device based on an expiration of a timer for the synchronized timeout value.

20. The non-transitory computer readable storage memory of claim 19, wherein the program comprising instructions executable to:
receive, from the end device, a resynchronization message that is effective to resynchronize the reception of communications from the parent device; and in response to reception of the resynchronization message, transmit synchronized communications to the end device.

\* \* \* \* \*